Dec. 22, 1931.  A. P. WARNER ET AL  1,837,384
VEHICLE BRAKE
Filed Jan. 10, 1928   4 Sheets-Sheet 4

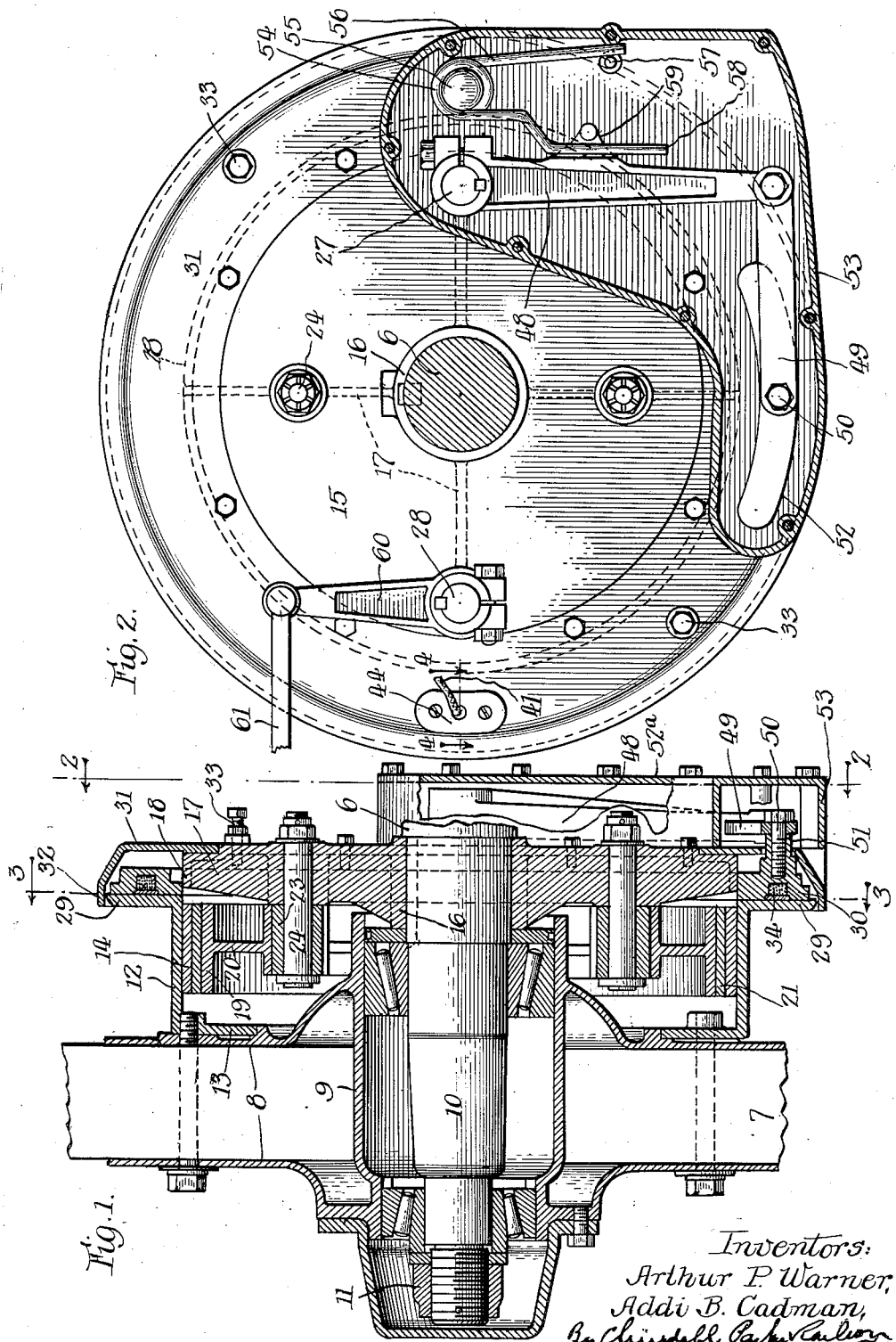

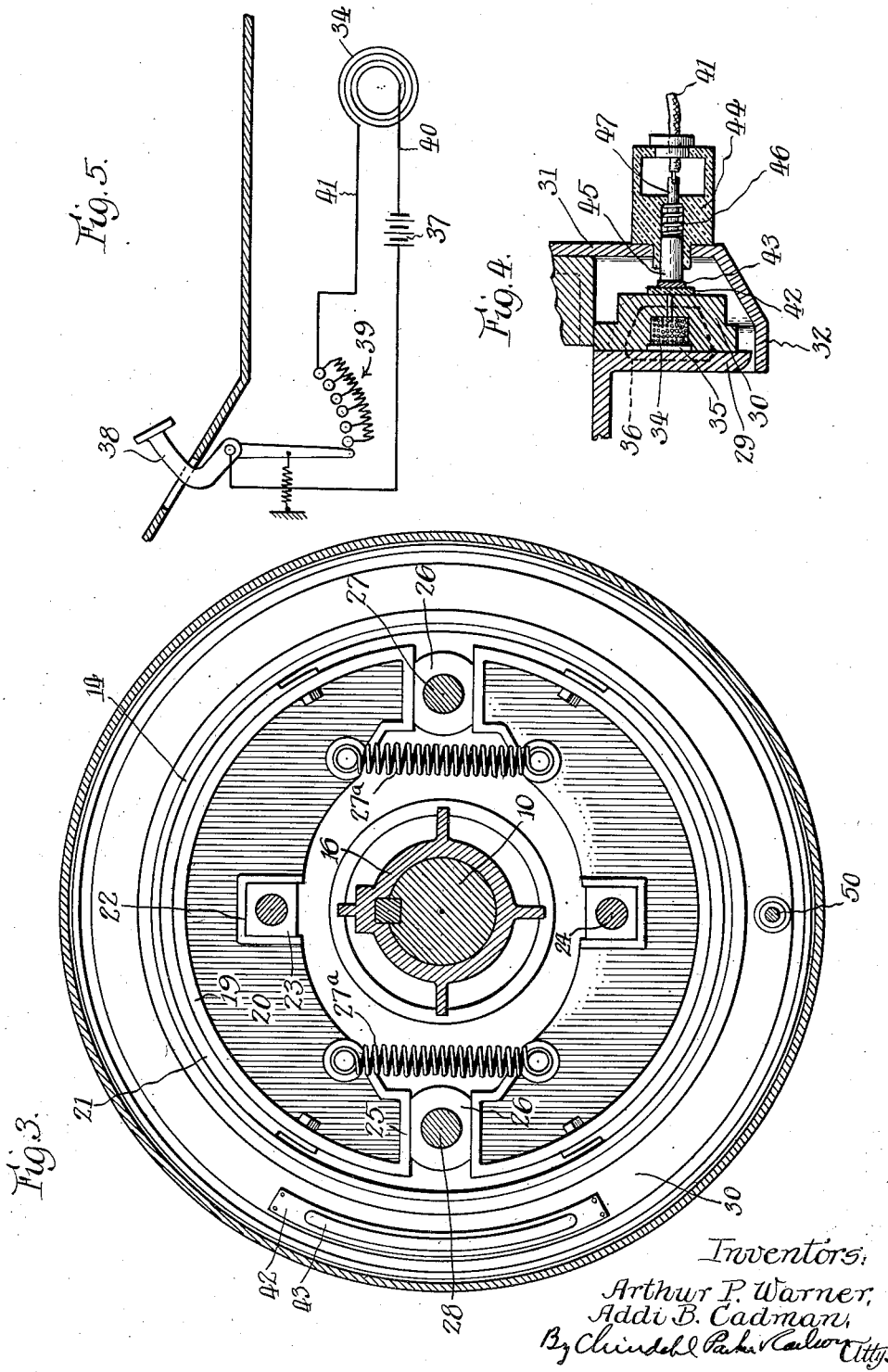

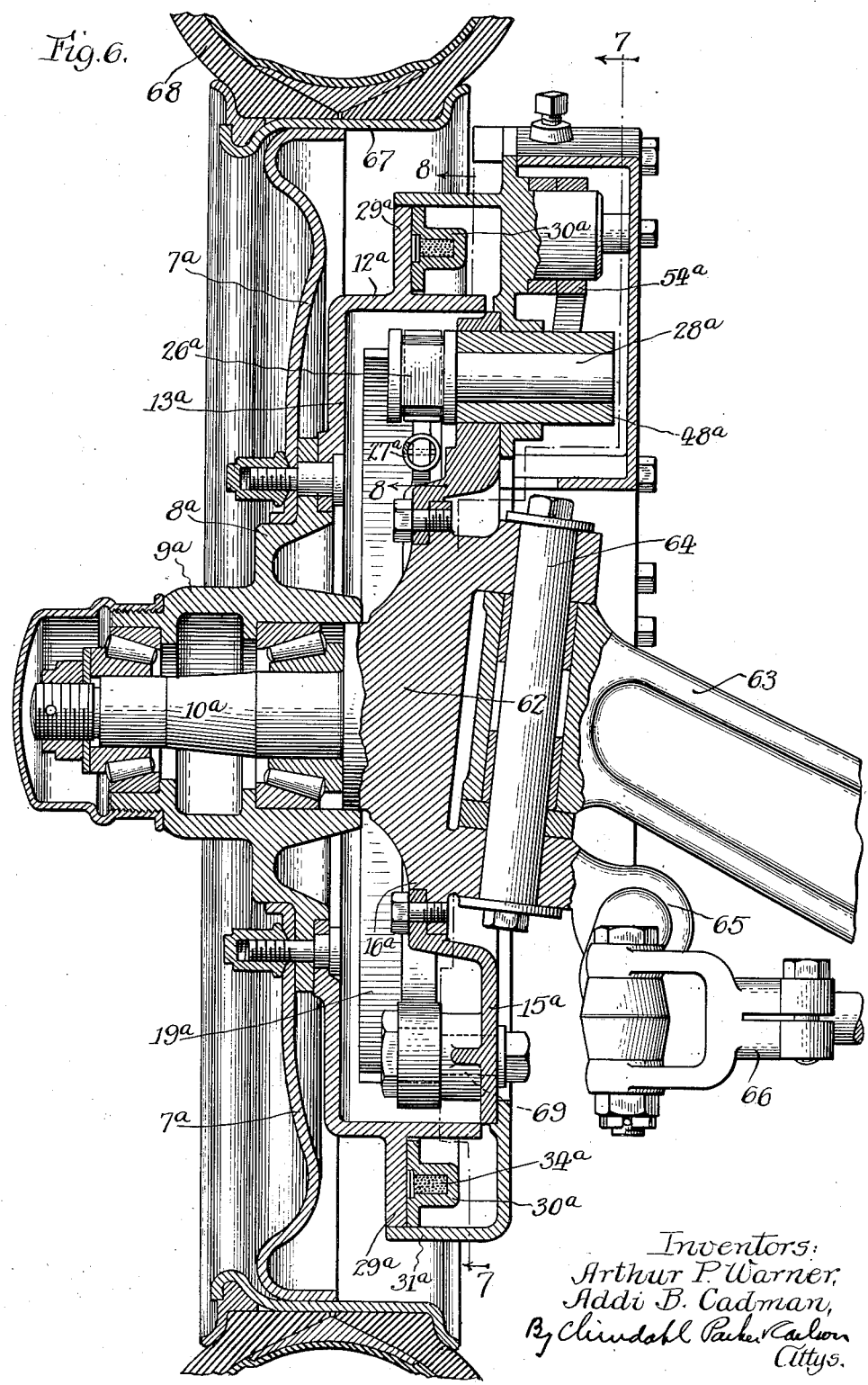

Inventors:
Arthur P. Warner,
Addi B. Cadman,
By Churchill Parker Carlson
Attys.

Patented Dec. 22, 1931

1,837,384

UNITED STATES PATENT OFFICE

ARTHUR P. WARNER AND ADDI BENJAMIN CADMAN, OF BELOIT, WISCONSIN, ASSIGNORS TO WARNER ELECTRIC BRAKE CORPORATION, OF SOUTH BELOIT, ILLINOIS, A CORPORATION OF ILLINOIS

VEHICLE BRAKE REISSUED

Continuation of application Serial No. 156,355, filed December 22, 1926. This application filed January 10, 1928. Serial No. 245,714.

This invention relates to friction brakes for vehicles and contemplates more particularly an electromagnetically controlled brake wherein the braking action is obtained by virtue of the motion or momentum of the vehicle.

The brakes commonly provided on present day automobiles, trucks and the like have certain well known deficiencies and disadvantages, a brief statement of which will be conducive to a better understanding of our invention.

First, these present brakes are operated by the physical effort of the driver, which necessitates the use of braking surfaces or linings having the highest possible coefficient of friction in order to obtain sufficient braking force. The best lining known for this purpose is a fabric material which is relatively soft and therefore wears rapidly, necessitating repeated renewal during the life of the vehicle. Brakes constructed according to our invention do not depend upon the physical effort of the driver but utilize the momentum of the vehicle as a source of power which will effect a very powerful braking pressure and for this reason we are able to use braking surfaces or linings such as metal or hard friction material having a much lower coefficient of friction but giving vastly greater wear and longer life than the present brake linings.

Second, brakes now in use are operated from the foot pedal by connections usually in the form of links, levers, and rock shafts which add to the cost of the braking mechanism and which are affected by wear, looseness, springing of the parts, expansion of the brake drums by heating, etc. to such an extent that the braking action varies materially and the braking force on the different wheels is unbalanced, thereby requiring frequent adjustment especially with four-wheel brakes on automobiles where the front wheels are mounted on pivoted steering knuckles. Our brake eliminates the necessity for such mechanical connections, is unaffected by distortion of the brake drum, and therefore results in a more perfect balance of the braking action on the different wheels without the necessity of adjustment.

Some of the difficulties just mentioned are corrected by hydraulic brakes but the benefits are, to a large extent, offset by disadvantages incident to the leaking of the liquid, clogging of the ports, etc. Air brakes also have been used on larger types of vehicles but are objectionable because of their high cost of installation and maintenance and the difficulty of instantaneously and accurately controlling them. Our electric brake corrects the difficulties outlined and at the same time avoids the offsetting disadvantages of hydraulic and air brakes.

It is a general object of our invention to provide a vehicle brake which is superior to any brake now known and which has four outstanding advantageous characteristics, viz., (a) a brake that requires a negligible amount of physical effort by the driver, (b) one that will produce an extremely powerful braking force, (c) one that is extremely sensitive, positive and uniform in controllability by the driver, and (d) one which is simple and durable in construction, inexpensive to manufacture, low in maintenance cost, and is not subject to the necessity of frequent adjustment to maintain its efficiency.

In carrying out this general object we have devised a vehicle brake which includes the braking means proper (herein shown in the form of a drum and a coacting braking device), and a pair of magnetic friction elements electrically controlled by the driver through suitable means such as a rheostat, said elements deriving power from the motion of the vehicle and being arranged to operate said braking means through connections so constructed as to multiply the force received from said friction elements and deliver the increased force to said braking means.

Another object is to provide a novel vehicle brake wherein the braking force is derived through the frictional gripping engagement of magnetic elements which are so constructed that they are operable from the usual storage battery or other source of electrical energy without unduly discharging or overloading the same under normal conditions of braking.

Still another object is to provide a novel operator in a vehicle brake capable of deriving variable actuating forces from the momentum of the vehicle, including an electromagnetically controlled friction device the coacting elements of which are so related that a sensitive operation of the device and consequently a graduated braking action is obtained throughout the entire range of variation of the energizing current in the device.

A further object is to provide, in a brake mechanism wherein the braking action is governed by the degree of frictional gripping engagement between two coacting magnetic elements, means acting to urge said elements into contact or very close proximity so as to decrease and maintain substantially constant the reluctance of the magnetic circuit through the elements.

Another object is to provide a unitary electrically controlled brake operator of the momentum type which is individual to and compactly associated with a brake of the usual drum type on a vehicle wheel, such association being accomplished by so positioning the magnetic friction elements and force augmenting connections constituting the operator within or in such close proximity to the space normally provided for the brake structure on said wheel as to avoid interference between the parts of the operator and the wheel, the axle or other parts of the vehicle.

A further object is to provide an electromagnetically controlled brake of the momentum type for a dirigible wheel wherein the associated parts of the electromagnetic operator and the braking members are arranged in a compact unit which is operatively disposed about a free open axial space of sufficient dimensions to accommodate the usual yoke type steering knuckle construction without disturbing the normal relation between the plane of rotation of the wheel and the pivotal axis of the knuckle, and without material increase in the dimensions of the brake structure relative to the diameter of the wheel.

Another object is to provide an electrically-controlled momentum brake for vehicles which will respond instantly and uniformly to the application of current thereto and produce a braking action determined solely by the strength of said current, and which has means for effectually restoring its operating parts to normal position after the current flow has been cut off so as to quickly and reliably release the brake.

It is also an object of this invention to provide a novel electrically controlled operator for a vehicle brake of the momentum type which is operable to set the brake in a small fraction of one revolution of the wheel following the energization of the electric control means.

Other objects and advantages of the invention will become apparent from the following description taken in connection with the accompanying drawings, in which:

Figure 1 is a fragmentary view in vertical section of a vehicle wheel equipped with an electric brake embodying the features of the present invention.

Figs. 2 and 3 are sectional views taken respectively along the lines 2—2 and 3—3 of Fig. 1.

Fig. 4 is an enlarged sectional view on the line 4—4 of Fig. 2.

Fig. 5 is a diagrammatic view of the electrical control circuit for the brake.

Fig. 6 is a view in vertical section of a dirigible vehicle wheel supporting a pivoted axle and equipped with an electric brake embodying the present invention, as seen on the plane of the line 6—6 in Fig. 7.

Although the invention is susceptible of various modifications and alternative constructions, we have shown and herein described in detail the preferred embodiment but it is to be understood that we do not thereby intend to limit the invention to the specific form disclosed but intend to cover all modifications and alternative constructions falling within the spirit and scope of the invention as expressed in the appended claims.

Generally stated, the present invention includes friction braking means, preferably of the shoe or band type, and a magnetic friction operator therefor controllable by the vehicle driver by regulating the flow of current thereto from a storage battery or other source of electric energy on the vehicle to be braked, the operator being adapted when energized to derive energy from the motion or momentum of the vehicle and to apply this energy to said braking means with increased mechanical advantage. The operator, in the embodiments selected for the purpose of illustration, is individual to the brake on one vehicle wheel and includes a friction device composed of two magnetic friction elements, one rotatable with the vehicle wheel, the other being operatively connected to the braking means through a force-augmenting mechanism for setting the brake upon limited oscillation of the driven element in either direction from its brake-released position in which it is normally maintained. An electromagnetic winding forms, with one of said elements, an efficient electromagnet which, when energized, causes frictional gripping engagement of the elements, with a force proportional to the strength of the energizing current. The driven element being thus magnetically attracted to the rotating element, is carried along therewith for a short angular distance, thereby actuating the force-multiplying mechanism to operate the braking means. When the brake becomes set, the unity of motion of the elements is broken and the resulting frictional slippage between the elements allows for further rotation of the driving element which holds the driven element in brake-setting position so long as the elements remain magnetized, but upon the interruption of the energizing current the parts of the operator are quickly restored to brake-released position. This may take place after the vehicle has come to rest or its speed reduced to the extent desired by the driver.

Figure 7:
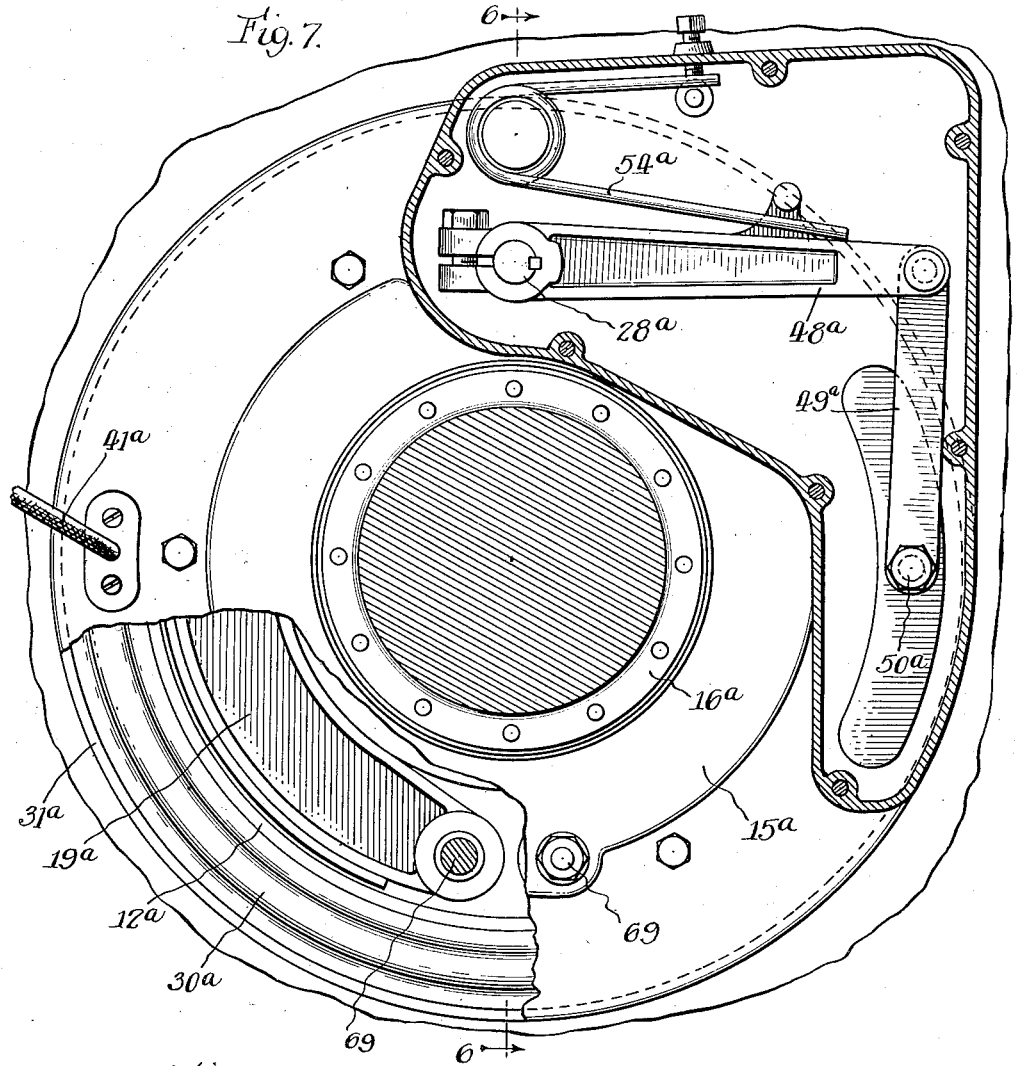
Fig. 7 is a side elevation of the brake structure shown in Fig. 6 with a portion of the structure housing broken away to disclose the internal construction, as viewed on the planes of the line 7—7 in Fig. 6.
Figure 8:
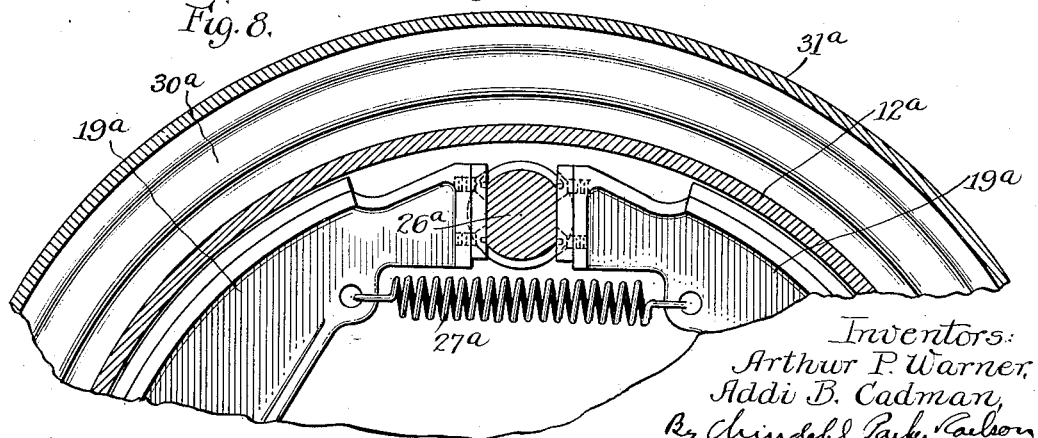
Fig. 8 is a fractional detailed view in section taken on the plane of the line 8—8 of Fig. 6.

To describe the exemplary form of the invention more particularly, reference will first be made to Figs. 1 to 5 of the drawings wherein a drum brake of the internally expansible type is illustrated in conjunction with a standard vehicle wheel mounted on the end of a dead or stationary axle 6, the size and shape of which is determined by the weight and type of the vehicle on which the axle is employed. Herein the wheel is shown as comprising spokes 7 secured between flanges 8 of a hub 9 which is rotatably mounted in the conventional way through bearings on the end or spindle 10 of the axle. A nut 11 threaded onto the spindle serves to hold the wheel the position on the axle. This type of wheel and the bearing therefor, thus selected to illustrate the present brake, are commonly employed on heavy duty vehicles such as trucks having dead rear axles and trailers, but the brake may be equally well adapted for use on wheels mounted on driving axles, or on pivoted steering knuckles such as are more commonly employed on passenger vehicles. Such adaptation to passenger vehicle wheels is shown in Figs. 6 to 8, fully described hereinafter, wherein the exemplary form of the invention is associated with a wheel mounted on a pivoted steering knuckle of a type commonly used on the dirigible front wheels of automobiles.

Mounted on the inner side of the wheel so as to rotate therewith is a revoluble member in the form of a drum 12 disposed concentrically with respect to the axis of the wheel and having a diameter substantially less than that of the wheel. Herein the drum has an inturned flange 13 at its outer end which is bolted or otherwise secured to the inner hub flange 8. If desired, the drum may be lined with a strip 14 preferably of metallic material providing an internal peripheral braking surface.

In the present instance, the inner or open end of the drum is closed by a substantially flat disk member or casing 15 received on the axle 10 adjacent the inner end of the hub 9 and firmly held against rotation as by keying an integral hub portion 16 thereof to the axle. The casing may be reinforced by radially extending internal ribs 17 joined at their outer ends by a peripheral flange 18.

The gripping devices or shoes which constitute the non-rotatable part of the brake and which are adapted to engage frictionally with the internal surface of the lining 14 to effect the braking action, may be of any preferred construction, the ones illustrated in Fig. 3 being segmental in form, each comprising an arcuate backing portion 19 reinforced by an internal rib 20. Preferably, a covering 21 of suitable material is secured to each shoe as by means of bolts. Because of the enormous braking force available with the present power brake, the coverings may be made of metal or other material having a lower friction coefficient but greater resistance to wear and deterioration by heat than ordinary fabric brake linings. A covering material known to the trade as "brake block" and having substantially the same friction properties as steel but more resistant to wear has been found to give the desired braking action. The use of such friction material positively eliminates the well known annoyance called "squeaking" which is prevalent in brakes having fabric linings.

The brake shoes are arranged in end to end relation within the drum and firmly held against rotation, at the same time being freely expansible. To this end, the rib 20 of each shoe is formed intermediate its ends with a radially extending flanged recess 22 which fits over a squared bushing 23 extending parallel to the drum axis and secured by bolts 24 passing through apertured bosses formed on the vertical ribs of the casing 15.

Associated with the adjacent end portions of the brake shoes in Fig. 3 are suitable expanding devices which, when actuated, are adapted to spread the shoes apart and thus press the coverings 21 into braking engagement with the lining 14. In the present instance, these devices comprise cam blocks 26 mounted between the ends of the shoes to oscillate on fixed axes which extend parallel to and are spaced a substantial distance from the axle 10. To this end, the blocks are formed integral with or otherwise rigidly secured to rockshafts 27 and 28 which are journaled intermediate their ends in bosses formed at opposite ends of the horizontal casing rib 17. Each block 26 is composed of hardened steel and is of substantially rectangular shape so that upon oscillation in either direction from the normal brake-released position shown in Fig. 3, the remote corners will bear against and spread the opposed webbed ends 25 of the shoes. Contractile springs 27ᵃ anchored to the shoes serve to contract the shoes within the drum as permitted by the angular positions of the cam blocks. Since the expanding devices thus provided are offset or located eccentrically with respect to the axle 10 and near the periphery of the drum, they are not limited in size, shape or degree of motion by the axle and wheel hub or by the usual steering knuckle when the brake is applied to a dirigible wheel as in Figs. 6 to 8. Thus, the blocks may be constructed short enough to give the desired expansive force on the brake shoes for a small oscillation of the rock shafts and yet long enough to prevent wearing or rounding off at their ends under the operating conditions normally encountered in service.

That part of the operator which is adapted to convert a portion of the energy available by virtue of the momentum of the vehicle when in motion into a form which may be utilized for actuation of the brake expanding devices comprises two friction elements which may be drawn into firm gripping engagement by the energization of an efficient electromagnet. One of these elements is arranged to rotate in unison with the wheel to which the brake is applied and in the form herein illustrated comprises an external peripheral flange 29 formed integral with or otherwise supported by the drum so as to present a plane annular surface which faces inwardly from the wheel and is substantially flush with the open end of the drum. Thus, in the present instance, the radial width of this surface is relatively small and its diameter is slightly larger than that of the drum.

The friction surface of the other element is of the same diameter as the flange 29 and preferably is on a substantially rigid ring 30 received loosely upon an external bearing surface provided by the flange 18 of the casing 15. A floating mounting is thus provided for the ring which holds the ring firmly in coaxial relation with respect to the brake drum at the same time allowing for oscillation of the ring about the drum axis. Such mounting also allows for approaching movement of the ring in an axial direction toward the flange 29 to permit of frictional engagement between its flat surface and the friction surface of the flange 29. The ring is of such narrow radial width and spaced so remotely from the axle 6 that it is relatively light in construction and does not preclude the expanding devices or other parts of the braking means proper from being simply constructed and mounted in the usual way.

To exclude dust and dirt from the friction surfaces between the elements and the bearing surfaces between the ring 30 and the casing 15, an annular member 31 constituting an extention of the casing 15 and carried thereby is formed with a peripheral flange 32 enclosing the ring and overlying the flange 29.

Means such as adjusting screws 33 may be provided to hold the ring 30 adjacent the flange 29 but preferably not so close as to allow any portion of the ring to become wedged between the ends of the screws and the rotatable flange 29 due to the slight lateral wobbling of the flange during rotation.

In the preferred form of the invention, the two friction elements are formed of magnetic material and constitute the core and armature of a powerful electromagnet which is capable of producing the necessary gripping action when energized with a comparatively small current such as can be safely drawn from the ordinary storage battery on a vehicle without unduly discharging the same. While either of the elements may be constructed to constitute the magnetic core, it is preferable that the ring 30 serve this purpose because the electrical connections thereto may be made simpler and more reliable. Herein the ring 30 carries a winding or coil 34 comprising an insulated conducting wire wound continuously in a series of annular turns to form a single annulus which is snugly mounted in an annular groove formed in the ring 30 centrally of its friction surface. The groove may be closed by a ring 35 of non-magnetic material thereby tightly sealing the coil 34 within the ring 30. With the magnet thus constructed, the two concentrically arranged portions of the flat friction surface on the ring constitute pole faces of opposite polarity between which a magnetic flux flows whenever the winding is energized. The area of the friction face of the magnet and the ring 35 which also presents a friction surface is such as to properly distribute frictional wear and to provide for the rigidity of the magnet structure when griping the rotating flange or armature. To lighten the magnet and still leave an ample path for the flow of flux through the magnetic circuit, the back portion of the ring 30, in the form illustrated, is cut away at its inner and outer peripheral edges.

In operation, the initial flow of current in the magnet winding produces a flux which flows in a mean path indicated approximately by the dotted line 36 in Fig. 4, thereby causing magnetic attraction to the rotatable flange armature. The force thus produced acts in an axial direction to draw each elemental portion of the magnet ring firmly against the flange 29. Such intimate gripping engagement may involve a slight yielding of portions of the flange 29 or the ring 30. The frictional force resulting from the gripping engagement of the magnetic elements tends to produce continued movement of the driven element or ring along with the rotating flange and the magnitude of this force is equal to the product of the normal pressure or magnetic attraction and the friction coefficient between the coacting surfaces.

The present magnet is extremely efficient in its operation, that is to say, a maximum attractive force is obtained with a minimum number of ampere turns effecting economy in manufacture and with a minimum current consumption. For example, with a magnet constructed for use in a brake for a ten-ton freight-hauling vehicle and having a coil of sixty-three turns, an attractive force of four thousand pounds is exerted when the coil is energized with a current of 4.75 amperes to give a maximum application of the brake. This current consumption may be compared to the rate of consumption of from 7 to 10 amperes in the average automobile lighting system and the rate of consumption in a vehicle starting motor while running of approximately 100 amperes. For use in the brakes of lighter passenger cars, each brake magnet can be designed to draw a current of less than one ampere for maximum brake application and less than one-half ampere for ordinary braking. Thus, the flow of current to give maximum braking at all four wheels of such a vehicle would be approximately four amperes which represents a small part of the recharging capacity of the generator provided on modern self-propelled vehicles and even if drawn frequently from the battery, would not unduly discharge the same.

Among the factors to which the high efficiency of the present magnetic friction device may be attributed are the substantial elimination of an air gap between the magnetic poles and the armature by means to be later described, the short length of the flux circuit, and the utilization of all available flux lines produced by the magnetic winding. The two features last named result from the use of a single annular winding immediately surrounded and substantially enclosed by the metal of the ring 30 which is of such thickness as to conduct the flux efficiently.

An important advantage accruing from the use of friction elements which are brought into gripping engagement by a force acting in an axial direction is that the operation of the elements and therefore the control of the braking action is not materially affected by expansion of the drum by the heat developed in braking the vehicle. In other words, since the coacting friction surfaces are disposed radially or perpendicular to the drum axis, variation in diameter of the rotating or driving element by heating does not change the operative relation of the elements. Moreover, such axial engagement does not produce an end thrust on the vehicle wheel, because the gripping force originates within instead of externally of the coacting elements.

The winding 34 for controlling the operation of the friction operator is intended to be energized from the usual storage battery 37 (Fig. 5) or other source of current at substantially constant potential and the flow of current through the windings of the brake magnets of the several vehicle wheels may be accurately varied in successive increments by a hand or foot operated control device such for example as a pedal 38, the movements of which operate a suitable rheostat 39. The energizing circuit for the magnet winding is indicated diagrammatically in Fig. 5 and preferably extends from the grounded battery terminal through a conductor 40 comprising the vehicle frame, the axle 10, the casing 15 and the ring 30 which is electrically connected to one terminal end of the winding 34. The other battery terminal is connected to the rheostat 39 which in turn is connected to the other winding terminal through an insulated conductor including a wire 41 and suitable means to allow for oscillation of the magnetic ring 30, this being accomplished in the present instance through the medium of the wiping contact construction shown in Fig. 4. For this purpose, an arcuate strip 42 of insulating material is mounted on the back of the ring 30 and carries a metallic contact strip 43 connected to the insulated terminal of the winding 34. Mounted on the closure member 31 is a junction box 44 of insulating material providing a recess in which a reciprocable brush 45 is mounted in position to contact the strip 43 substantially centrally thereof when the ring 30 is in normal or brake-released position. A compression spring 46 encircling a shank 47 on the brush and acting between the brush and the end of the brush recess constantly urges the brush into contact with the strip 43. Thus, the brush is adapted to contact the strip continuously throughout the range of oscillation of the magnet ring 30 in either direction despite any lateral wobbling of the flange armature 29 in its rotation. The conductor 41 leading from the rheostat may be secured to the vehicle chassis with its remote end extending into and stationarily supported by the junction box 44 for connection with the brush 45. Thus a simple and flexible connection is provided between the brake control means and the actuating mechanism on the vehicle wheel which connection replaces the heavy and usually complicated mechanical or hydraulic operating connections now in common use on automotive vehicles for transmitting the braking force to the several brakes from the common source of braking power.

It should be observed in passing that with the means herein contemplated for controlling the present friction operator, very little physical effort on the part of the vehicle driver is necessary in order to set the brakes. Furthermore, since only a slight movement of the driver's foot is required to close the circuit through the magnetic winding as compared to that required to operate a standard brake foot pedal, the present control device can be so closely associated with the accelerator of the vehicle as to materially reduce the time required for the driver to withdraw his foot from the accelerator pedal and place it on the brake control pedal, thereby materially reducing the time required to initiate the application of the brakes.

The force made available by energizing the magnet of the friction operator when the vehicle is in motion may be applied with increased mechanical advantage to either or both of the expanding devices for setting the brake. The mechanism herein employed for thus augmenting the frictional force is adapted to actuate the rock shaft 27 in either direction and includes a substantially straight crank arm 48 rigidly fixed as by keying to the end of the rock shaft which is located outside of the casing 15. The crank thus being free to oscillate in a vertical plane disposed outside of the drum and adjacent the ring 30 may be made of a length substantially equal to the radius of the ring 30 and thus adapted to provide a moment arm of maximum length for the force available at the driven friction element. As a means for operatively connecting the driven element to the crank, a link 49 may be employed, said link being pivotally connected at one end to the outer or free end of the crank and at its other end to a stud 50 outside of the casing member 31. The stud may be anchored in the ring 30 as by threading into a boss 51 so as to project through an arcuate slot 52 in the member 31, allowance being thereby made for the necessary oscillation of the magnet in either direction.

Preferably the length of the link 49 is such as to hold the crank 48 in perpendicular relation with respect to a diameter including the axes of the drum and the rock shaft 27 when the ring 30 is in normal or brake released position as shown in Fig. 2. Thus the actuating force applied to the crank by the driven friction element acts tangentially of the ring 30 and in a direction perpendicular to the crank so that its moment arm is substantially equal to the radius of the ring regardless of the direction in which the crank arm is oscillated. The crank arm 48 and the cam block on the rock shaft 27 constitute in effect a bell crank lever which is capable of transmitting the actuating force to the brake shoes with a mechanical advantage which is equal approximately to the length of the crank arm 48 divided by the radial distance between the axis of the rock shaft 27 and the remotest point of contact between the ends of the shoes and the expanding cam block. In the brake shown in Figs. 1 to 3, as designed for a ten-ton road vehicle, this ratio is approximately 17 to 1 so that with a frictional force of 1000 pounds (which is produced by an attractive force of 4000 pounds between the friction elements when a current of 4.75 amperes is passed through a coil of 63 turns, as heretofore explained) the brake shoes will be expanded with a force of approximately 17,000 pounds.

It will be observed that the operating parts of the force-multiplying connection between the driven friction element and the brake shoes are so constructed and arranged that the proper degree of mechanical advantage is obtained in spite of the fixed structural relation which exists in the conventional drum type of brake between the axle, the brake drum, and the enclosing casing therefor. Thus by arranging the crank arm 49 so that it extends in a non-radial direction, that is, at an angle to a diameter passing through the axes of the drum and the rock shaft 27, the length of the arm may be substantially greater than the distance between the axle and the rock shaft 27 and therefore such as to actuate the expanding device with the desired leverage. By directly associating the movable parts of the expanding device with the end portions of the brake shoes, they may be so coordinated structurally with the crank arm that sufficient multiplication of the actuating force is obtained through the combined action of the crank and the expanding device. Furthermore, all of the parts of the force multiplying connections are located so remotely from the axle, and their ranges of movements in either direction to apply the brake are such that their operation is not interfered with by the usual steering knuckle when the present brake is adapted to a dirigible wheel, as shown in Figs. 6 and 7.

An inherent characteristic of brakes wherein the actuating force is derived from the momentum of the vehicle is that further movement of the vehicle is required to set the brake following the operation of the driver's control device. Therefore, in adapting the momentum principle of operation to a brake for a modern automotive vehicle which must respond instantaneously to the driver's control, a movement of the vehicle corresponding to only a small fraction of a revolution of the vehicle wheels is allowable for operating the brakes. This result is accomplished in the present instance by employing a magnet capable of exerting an attractive force of large magnitude; by magnifying the frictional force without unnecessary loss of motion; and by operating the augmenting mechanism at a point as remote as practicable from the drum axis. With such a large attractive force as may be obtained by the present magnet, only a moderate multiplication of the frictional force produced is necessary in order to give the required expansive force at the brake shoes. The angle through which the magnet ring must move to take up the normal clearance between the shoe coverings and the drum lining is accordingly lessened since the reduction in motion through the crank and the expanding device is proportional to the magnification of the force. The lineal movement of a point on the magnet ring being proportional to the distance from the drum axis, the movement of the vehicle required to take up the shoe clearance is further reduced in the present instance by providing a driving friction surface of comparatively large diameter, in the present instance slightly greater than that of the drum. By combining these various factors, the angular movement of the wheel which is required to set the brake following the energization of the magnet is practically negligible, corresponding in the present instance to a motion of the vehicle of approximately two inches.

Another advantage of the present force-multiplying mechanism is that its operating parts have a wide allowable range of movement so that wear on the shoe coverings is automatically taken up on each brake application, thereby making the brakes practically self-adjusting, and eliminating the annoyance and expense incident to the maintenance of proper adjustment in ordinary manually operable brakes.

In the present arrangement, the outer end of the crank 48 projects slightly beyond the circumference of the drum flange 29 and preferably is protected by a casing having a flat enclosing wall 52ª and a peripheral flange 53 secured as by bolts against the closure member 31 and an extended portion thereof. This casing completely encloses that portion of the force-multiplying mechanism which is located outside of the drum closure and is of such size and shape as to allow for proper movement of the operating parts and for clearance.

The attractive force which may be produced with a ring magnet of the above character, especially when it is to be energized from a storage battery or other source of relatively small capacity, is greatly impaired by the presence of a substantial air gap between the magnetic core and armature and varies to a marked degree with slight changes in the width of the gap. Such a condition, were it to exist in a friction operator of the present character, would be particularly disadvantageous in that it would prevent sensitive control of the braking action which is a desirable feature of brake control in automotive braking systems. For example, with an air gap of a given width between the magnetic elements, a current of such magnitude might be required to draw the elements into contact that excessive braking action would result by the greater attractive force and therefore the greater frictional force produced after closure of the magnetic circuit by such contact. Thus, the reluctance of the magnetic circuit would be a variable quantity, and the driver of the vehicle, not being able to gage the reluctance at any given time, would be unable to so regulate the current flow as to produce the intended deceleration of the vehicle. Various factors would tend to aggravate this difficulty in an operator of the present character, because of the normal relative rotation between the magnetic elements. Among these factors is the fact that the brake is subject to the severe strains and constant jarring incident to the use of the brake on an automotive vehicle. Other factors are the inherent lateral wobbling of the drum flange 29 due to inaccuracies in construction and mounting of the vehicle wheel and drum and to looseness and wear of the parts, and the fact that it is practically impossible to form the friction surfaces on the magnetic elements in true geometric planes.

All of these difficulties have been effectively overcome in the present brake by establishing such close association and constant relationship between the magnetic friction elements that the magnetic circuit through the elements is substantially closed at the time when the magnet becomes energized to set the brake. This is accomplished in the present instance by maintaining intimate mechanical contact between said friction elements at all times, and the means employed for this purpose comprises the coiled spring 46 (Fig. 4) which acts through the brush 45 to resiliently urge one side of the magnetic ring 30 toward the flange 29. Thus the spring acts to maintain the coacting surfaces of the elements in mechanical contact, thereby substantially closing the magnetic flux circuit at one or more points in spite of the inherent wobbling of the drum flange during rotation. With an initial metallic path of such low reluctance, a large magnetic flux and therefore a strong magnetic force will be developed upon the energization of the winding even with the minimum current which may be supplied by the rheostat control, and any portions of the magnet ring not then in contact with the flange will be drawn instantaneously against the flange, thereby completely closing the flux circuits around the entire periphery of the magnet. Thus, gripping engagement of the magentic elements will be effected by such a small current in the magnetic winding that the same current will not produce excessive braking after complete closure of the magnetic circuit by the engagement. In this way the uncertainty or variation in the action which would result from a substantial air gap between the elements is eliminated, and the braking action is governed solely by the strength of the energizing current, so that the driver has complete control of and can accurately and uniformly regulate the deceleration of the vehicle over the entire range of current variation by the control means.

Means supplemental to the springs 27ª is provided for normally holding the parts of the friction operator against movement in either direction by reason of any frictional engagement between the magnetic elements, and for quickly and reliably restoring the parts to brake-released position upon de-energization of the magnetic winding. In the present instance, this means comprises a spring 54 of the hairpin type mounted within the auxiliary casing on a stud 55 which projects outwardly from the member 31. The spring has an end 56 which is held fixed between a stationary pin 57 and the flange 53 and another end 58 which is movable and positioned between opposed lugs on a lateral extension 59 integrally formed on the crank arm 48. Normally, that is when the crank arm is in brake-released position, the spring is not under stress, but it is tensioned by flexure of the end 58 during oscillation of the crank in either direction. Then, when the winding is de-energized to release the brake, the spring operates to restore the crank and the parts operatively connected thereto to the normal position shown in Fig. 2. Since the force thus exerted is applied to the crank arm at a substantial distance from its axis, the force will be ample to overcome the normal frictional engagement between the magnetic elements and any adherence of the elements such as that due to residual magnetism.

To provide an auxiliary brake for use as an emergency or parking brake, the rock shaft 28 and the expanding cam thereof may be arranged for manual operation. For this purpose a crank arm 60 is fixed to the shaft 28 outside of the casing 15 and connected through mechanism including a rod 61 to a hand lever or other operating means located within the reach of the vehicle driver. Thus, the same shoes are adapted to be actuated either by the electrically controlled momentum actuating mechanism or by manual operation. When the electrically controlled brake is applied to the dirigible wheels of a vehicle, the manual operating means would preferably be omitted.

Referring now to Figs. 6 and 8 which show the brake applied to the front or dirigible wheel of an automobile, the general arrangement of the parts and their functional relationship are substantially similar to the construction hereinbefore described. In the latter figures, however, the specific arrangement is designed to accommodate the usual yoke-type steering knuckle structure without interfering with the normal operation thereof or necessitating any change in its structure or its conventional relationship to the wheel.

As illustrated in Fig. 6 the vehicle wheel comprises a disk 7ª secured upon a flange 8ª of the hub 9ª mounted on a spindle 10ª, the hub being provided with conventional anti-friction bearings. The spindle 10ª is integral with a yoke or steering knuckle 62 of conventional construction and pivotally supported upon the adjacent end of the stationary axle 63 by means of the pivot pin 64. A conventional steering arm 65 is provided, preferably integral with the spindle yoke or steering knuckle 62, and controlled by a drag link 66 pivoted thereon for manual operation in a well known manner, not shown herein. The disk 7ª supports upon its outer periphery a conventional rim 67 which carries a pneumatic tire 68.

The brake drum 12ª has a mounting flange 13ª secured to the hub flange 8ª for rotation with the wheel, the open inner end of the drum being substantially closed by an annular disk member 15ª rigidly mounted on a suitable flange 16ª provided on the spindle portion of the steering knuckle.

The braking members comprise shoes 19ª similar to those previously described and similarly arranged within the drum except that the shoes are held against rotation and at the same time mounted for expansible movement by being pivotally secured at one adjacent pair of the ends of the respective shoes upon pivot studs 69 rigidly mounted on the casing 15ª and extending through suitable bearings in the adjacent ends of the brake shoes.

A single cam block 26ª is positioned between the opposite adjacent ends of the pivoted brake shoes, the cam block being fixed in relation to a rock shaft 28ª having a suitable bearing support in the stationary casing member 15ª. Oscillation of the cam block in either direction effects the spreading of the shoes into frictional braking contact with the drum 12ª in similar manner to that previously described, the shoes being resiliently retained in contact with the cam block by a spring 27ª oppositely attached to the respective shoes.

It will be here noted that the arrangement of the shoes, together with their pivotal supports and expanding cam, is substantially confined within a narrow annular space immediately adjacent to the periphery of the drum and affording a large clear space about the axis of the wheel wherein there is ample room for the location and normal operation of the steering knuckle and the steering arm extending therefrom.

In the present arrangement the armature element 29ª of the electromagnetic brake actuating members is spaced from the inner edge of the drum 12ª and positioned substantially nearer the edge of the drum next to the wheel, preferably being integral with the drum structure. The magnet core element 30ª, carrying a conductor winding 34ª and constructed as previously described, is positioned about the inner portion of the drum. Immediately outward of the peripheral edge of the flange 29$^a$ is provided an annular flange 31$^a$, integral with or rigidly secured to the casing 15$^a$, and providing an outer housing for the magnet ring 30$^a$, the flange 31$^a$ and inner end of the drum 12$^a$ forming an annular chamber for floating retention of the core member 30$^a$ wherein the latter may move axially to and from its complementary armature member 29$^a$.

The magnetizing winding is energized through a conductor 41$^a$ associated with a brush structure such as is illustrated in Fig. 4, and which functions also to maintain mechanical contact at at least one point between the ring 30$^a$ and flange 29$^a$, as previously described herein.

The operating connections between the oscillatory magnet ring 30$^a$ and the cam block 26$^a$ are similar to that hereinbefore described and comprise a stud 50$^a$ mounted on the ring 30$^a$ and extending through a suitable slot in the casing 15$^a$, the stud 50$^a$ being pivotally connected by the link 49$^a$ with the free end of a crank arm 48$^a$ rigidly secured upon the rock shaft 28$^a$. By this means the oscillatory movement of the magnet ring 30$^a$ effects the operative movement of the cam block 26$^a$ and the application of the brakes in similar manner and with similar effect to that previously described. The elements of the operator and the brake shoes are maintained in brake released position, when the magnet is de-energized, by means of the spring 54$^a$ positioned and connected as previously described.

It will be noted that the construction disclosed in Figs. 6 to 8 provides a very compact unitary arrangement of the brake members and parts of the operator which is readily adaptable to mounting upon a dirigible wheel wherein ample space must be provided for the location and operative movement of the steering knuckle construction common to such wheels and wherein the pivotal axis of the steering knuckle may be maintained in the close proximity to the plane of rotation of the wheel necessary to the ease in steering with safe support which has been determined by previous practice.

It will be seen that the adaptability of the elements comprising the present invention to arrangement in compact unitary relation in a substantially annular space about a clear central space defined by the dimensions of the usual steering knuckle structure, is important in securing the advantages residing in the present invention to four wheel installations of vehicle brakes. It will also be seen that the actual power for setting the brake is created within the brake unit itself by the action of the electromagnetic friction device 29$^a$, 30$^a$, which derives force from the rotating wheel and transmits the force to the braking means, the conductor 41$^a$ constituting the sole connection between the unitary brake structure and the driver's control pedal or lever, thus eliminating all mechanical levers and linkage for this purpose.

Summarizing the characteristics of our invention, as they will now be understood from the foregoing description, our brake has the qualities of (first) requiring negligible physical effort by the driver, (second) producing extremely powerful braking action, (third) extreme sensitiveness and uniformity in action throughout the entire range of degrees of braking action, and (fourth) simple unitary construction and elimination of operating connections between the driver's control device and the brake which would require adjustment.

The two first named qualities flow from electrically controlling the brake and from derivation of power from the motion or momentum of the vehicle to set the brake.

The factors contributing to the third named quality are the character and construction of the electromagnetic friction device, i. e., the magnet and its armature; the means (in the present embodiment spring 46) for insuring or maintaining a definite or fixed relation between the magnet and its armature at the instant of energization of the magnet so as to provide a substantially invariable air gap (which in the present instance is zero at one point at least) and thereby insure an even or uniform flow of magnetic flux at each successive stage of movement of the controlling rheostat and avoid sudden or uneven "grabbing" of the brake; the construction and arrangement of the parts of the force-augmenting connection between said friction device and the braking means by which the brake will be set upon a small fraction of one rotation of the wheel and will be instantly and positively restored to brake released position.

The quality named fourth above resides in the construction and arrangement of the parts in a compact unit which creates or derives its own brake setting power upon energization of the magnet and requires no connection to the driver's control device other than a simple electrical conductor.

Extended rigid tests of brakes constructed in accordance with our invention over a long period of time and under all conditions, speeds and emergencies of driving have demonstrated for the present invention an ease and accuracy of vehicle control and rapidity of deceleration not possible with any means of braking heretofore known.

This application is a continuation of our prior application Serial No. 156,355, filed December 22, 1926.

We claim as our invention:

1. A vehicle brake comprising, in combination, a drum arranged to rotate with the vehicle wheel to be braked, a pair of brake shoes mounted within said drum, cam means located between adjacent end portions of said shoes for expanding them against the inner peripheral surface of said drum, a non-rotatable support closing the open end of said drum, a rock shaft journaled in said support and arranged to operate said cam means, a crank arm on said rock shaft, a peripheral flange carried by said drum disposed in a plane substantially perpendicular to the drum axis, a metallic ring mounted opposite said flange, and an electromagnetic winding in said ring adapted when energized to cause frictional gripping engagement of said ring and said flange, and means operatively connecting said ring and the free end of said crank arm whereby oscillation of said ring will expand said shoes.

2. An electric vehicle brake comprising, in combination, a drum arranged to rotate with the vehicle wheel to be braked, a non-rotatable member cooperating with said drum to provide a closed casing, brake means within said casing, an electromagnet located within said casing and adapted when energized to engage frictionally with a rotating surface on said drum, and a force multiplying connection for transmitting movement of said magnet to said brake means, a portion of said connection being located outside of said casing.

3. An electric vehicle brake of the momentum type, comprising in combination, a drum rotatable with the wheel to be braked, braking means within said drum, expanding means therefor including a rock shaft extending parallel to the drum axis and disposed near the periphery of the drum, an electromagnetically controlled friction device having a driving element rotatable with said drum and an oscillatory driven element mounted coaxially of the drum, said elements being adapted for frictional gripping engagement by a force acting in an axial direction, a crank arm fixed to said rockshaft and extending when in brake-released position in a direction substantially perpendicular to a diameter through the axes of said drum and rockshaft, and means rigidly connecting said driven element to the free end of said crank arm.

4. An electric vehicle brake of the momentum type comprising, in combination, a drum rotatable with the vehicle wheel to be braked, an expansible braking means within said drum, means carried by said drum and providing an inwardly-facing friction surface, a substantially rigid metal ring mounted for oscillatory movement and adapted for frictional gripping engagement with said surface by a force acting axially of said ring, electromagnetic means for causing such engagement, a rockshaft extending through said ring and spaced from the drum axis, means carried by said rockshaft for expanding said braking means, means operable to apply the actuating force derived through oscillation of said ring in either direction to said rockshaft including a crank arm fixed to said rockshaft, and means normally acting to maintain said ring in brake-released position.

5. An electric vehicle brake of the momentum type comprising, in combination, a drum rotatable with the vehicle wheel to be braked, a gripping device engageable therewith, a friction device adapted to be operated by electromagnetic action whereby to derive an actuating force from the motion of said wheel, mechanism for receiving said force and applying the same to said gripping device, said mechanism including a crank arm mounted for oscillation in a plane perpendicular to the drum axis, and means operable upon deenergization of said device after oscillation of said crank in either direction to apply a force to said crank in a direction substantially perpendicular thereto whereby to restore the crank to brake released position.

6. An electric vehicle brake of the momentum type comprising, in combination, a drum mounted on the inner side of the vehicle wheel to be braked and having an external flange portion providing an inwardly facing friction surface, a substantially rigid ring mounted opposite said surface for oscillation about the drum axis, an electromagnetic winding adapted when energized to cause magnetic attraction of said ring and said flange, a braking means within said drum, expanding means therefor spaced a substantial distance from the drum axis, mechanism receiving the force resulting from the magnetic attraction and frictional engagement of said ring and flange and operable to apply such force with increased mechanical advantage to said expanding means, and means acting to maintain said ring and said mechanism in brake-released position when said winding is deenergized.

7. An electric momentum brake for a vehicle wheel supporting an axle comprising, in combination, a drum rotatable with said wheel, expansible braking means within said drum, a friction device having a driving element carried by said drum externally thereof and an annular driven element adapted for frictional gripping engagement with said driving element by a force acting along the axis of said drum, a non-rotatable casing arranged concentrically with said axle and supporting said driven element in centered position opposite said driving element and for oscillatory movement, mechanism for applying the rotary power derived through the engagement of said elements and to said braking means, and electromagnetic means by which the degree of frictional engagement between said elements may be variably controlled.

8. An electric momentum brake for a vehicle wheel supporting an axle comprising, in combination, a drum carried by said wheel with one end thereof adjacent said wheel, braking means within said drum having adjacent end portions disposed near the periphery of the drum, a cam member positioned between said end portions and adapted for oscillation about an axis parallel to said axle whereby to spread said end portions, a crank arm rigid with said cam and extending in a non-radial direction with respect to said drum when said cam is in brake-released position, a pair of annularly arranged friction elements mounted for gripping engagement by the action of a force acting axially of said elements, one of said elements being carried by said drum so as to rotate therewith, said other element being associated with the free end of said crank arm so as to actuate the arm upon oscillation of said driven element in either direction, and electromagnetic means adapted to be variably energized to regulate the degree of frictional pressure between said elements in setting the brakes.

9. An electric vehicle brake of the momentum type comprising, in combination, a drum which rotates during motion of the vehicle, a braking device engageable therewith, actuating means for said braking device including a crank arm mounted to oscillate in a path not including a diameter of said drum, a pair of friction elements adapted for gripping engagement by a force acting in a direction axially of said drum, one of said elements being operatively associated with the free end of said crank arm so as to actuate the arm upon oscillation in either direction, and electromagnetic means by which the degree of gripping engagement between said elements may be variably controlled.

10. An electric momentum brake for a vehicle wheel supporting an axle, a drum which rotates with said wheel, a braking device adapted for movement into engagement with said drum and having adjacent end portions, means associated with said end portions and operable to apply said device to said drum, said means including a crank arm normally extending in a non-radial direction with respect to said drum axis when in brake-released position, said arm being mounted to oscillate about a fixed axis which is spaced from and extends parallel to said axle, two annular friction elements adapted for gripping engagement by the action of a force acting axially of said drum, one of said elements having a friction surface which rotates with said drum, said other element being connected to the free end of said crank arm so as to apply thereto an actuating force derived through the engagement of said elements, and electromagnetic means by which the degree of gripping engagement between said elements may be variably controlled.

11. An electric momentum brake for a wheel supporting a vehicle axle comprising, in combination, a drum which rotates about said axle during motion of said wheel, segmental brake members arranged around said axle within said drum, an expanding device spaced from said axle and adapted to work against adjacent end portions of said members, an outwardly projecting substantially radial flange carried by said drum and providing an annular friction surface of narrow radial width which faces inwardly relative to said wheel, an annulus of substantially the same radial width as said surface supported opposite the surface for frictional engagement therewith, an electromagnetic winding adapted when energized to cause attachment of said annulus magnetically to said surface, and force-multiplying mechanism connecting said annulus and said expanding means.

12. An electric momentum brake for a wheel supporting a vehicle axle, comprising, in combination, a drum rotatable with said wheel and arranged concentrically about said axle, brake means arranged within said drum about said axle and having adjacent separable end portions, means operable to spread said end portions whereby to expand said brake means against said drum, a driving element carried by said drum and having a friction surface of narrow radial width and of substantially the same diameter as said drum, an oscillatory driven element having a friction surface of substantially the same diameter and radial width as said first mentioned surface and adapted for gripping engagement therewith, electromagnetic means adapted when energized to cause gripping engagement of said elements, force-augmenting mechanism connecting said driven element and said expanding means, and means operable to restore said driven element and said mechanism to brake-released position after deenergization of said electromagnetic means.

13. An electric momentum brake for a vehicle having, in combination, friction brake members adapted when engaged to check the motion of said vehicle, and an actuating mechanism comprising a friction element which normally rotates when the vehicle is in motion, an ascillatory friction element connected to one of said friction members for operating the same, an electromagnetic winding associated with one of said elements and adapted when energized to draw the elements into frictional gripping engagement and thereby cause oscillation of said driven element, and yieldable means acting on one of said elements and normally tending to urge said elements resiliently toward each other.

14. An electric momentum brake for a vehicle having, in combination, friction brake members adapted when engaged to check the motion of said vehicle, a friction element which rotates when said vehicle is in motion, a driven friction element adapted for engagement with said rotating element and when so engaged to derive an actuating force from the momentum of the vehicle and apply such force to one of said brake members, an electrical winding adapted when energized to magnetize said elements and thereby cause them to be drawn into gripping engagement, and means supplemental to said winding acting to urge said elements into close proximity to each other and thereby decrease the reluctance of the magnetic circuit through said elements.

15. An electromagnetic vehicle brake having, in combination, two magnetic elements mounted for relative rotation, means for magnetizing said elements to cause attraction toward each other, and means acting automatically to urge said elements into close proximity and thereby decrease the reluctance of the magnetic circuit through said elements.

16. An electric momentum brake for a vehicle having, in combination, a revoluble member, a braking device adapted for engagement with said member whereby to control the motion of said vehicle, a friction element which normally rotates simultaneously with said member, a second friction element adapted for engagement with said first mentioned element and operatively connected to said braking device for actuating the same, an electrical winding associated with one of said elements and forming therewith an electromagnet of which said other element is the armature, and means normally operating to maintain intimate mechanical contact between said elements and thereby provide a substantially closed metallic circuit for the flow of magnetic flux produced upon the initial energization of said winding.

17. An electromagnetic brake for a vehicle wheel having, in combination, a magnetic element rotatable with said wheel and having an annular friction surface spaced a substantial distance from the wheel axis and disposed in a plane substantially perpendicular to said axis, a second magnetic element mounted opposite said first mentioned element and having a friction surface adapted for coacting engagement with said other surface, an electromagnetic winding carried by one of said elements and adapted when energized to cause magnetic attraction which produces a force acting in an axial direction thereby causing gripping engagement of said elements, and means supplemental to said winding acting automatically to urge said elements into intimate mechanical contact with each other and thereby decrease the reluctance of the magnetic circuit through said elements.

18. An electric vehicle brake of the momentum type comprising, in combination, a drum which rotates during motion of the vehicle, braking means mounted within the drum and having adjacent end portions located near the periphery of the drum, means located near and cooperating with said end portions for expanding said braking means, a magnetic element mounted to rotate with said drum and having an annular friction surface disposed externally of the drum, a driven magnetic element mounted for oscillatory movement and adapted for frictional engagement with said annular surface, electromagnetic means adapted when energized to magnetize said elements and thereby cause gripping engagement thereof, means operative to transmit force from said driven element to said expanding means, and means acting to restore said oscillatory friction element to brake-released position.

19. An electric vehicle brake of the momentum type comprising, in combination, a drum arranged to be mounted on the inner side of the vehicle wheel to be braked with one end thereof closely adjacent to said wheel, braking means mounted within the drum and having adjacent end portions located near the periphery of the drum, means located near and cooperating with said end portions for expanding said braking means, an element mounted to rotate with said drum and having an annular friction surface, a driven element mounted for oscillatory movement and adapted for frictional gripping engagement with said annular surface, electromagnetic means adapted when energized to produce a force acting in an axial direction thereby causing such engagement, and means operative to transmit force from said driven element to said expanding means with increased mechanical advantage.

20. An electric vehicle brake of the momentum type comprising, in combination, a drum arranged to be mounted on the inner side of the vehicle wheel to be braked with one end thereof closely adjacent to said wheel, braking means mounted within the drum and having adjacent end portions located near the periphery of the drum, means located near and cooperating with said end portions for expanding said braking means, an element mounted to rotate with said drum and having an annular friction surface disposed externally of the drum, a driven element mounted for oscillatory movement and adapted for frictional gripping engagement with said annular surface, electromagnetic means adapted when energized to cause such engagement, and means operative to transmit force from said driven element to said expanding means.

21. An electric vehicle brake of the momentum type comprising, in combination, a drum which rotates during the motion of the vehicle, friction brake means mounted within said drum and having adjacent end portions, a non-rotatable support, a member mounted on said support to oscillate on an axis which extends parallel to and is spaced from the drum axis, said member having means operable upon oscillation of the member to spread said end portions and thereby expand said brake means into engagement with said drum, two friction elements having opposed surfaces disposed externally of the axis of said member and adapted to be frictionally gripped together, one of said elements being carried by said drum, the other element being adapted for oscillation about the drum axis and operatively connected to said member for actuating the same, electromagnetic means adapted when energized to cause frictional engagement of said elements, control means by which the flow of current in said electromagnetic means may be varied in successive increments to regulate the degree of gripping force between said elements, and means for restoring the said last mentioned element and said expanding means to brake-released position when the flow of current in said electromagnetic means is interrupted.

22. An electric vehicle brake of the momentum type comprising, in combination, a rotatable drum, expansible brake means within said drum, expanding means therefor, actuating mechanism for said expanding means including two friction elements arranged for gripping engagement one adapted to rotate simultaneously with said drum, the other being operatively connected to said expanding means for actuating the same, an electromagnetic winding adapted when energized to cause gripping engagement between said elements, spring means normally acting to contract said brake means within said drum, and supplemental spring means acting on said mechanism for restoring the mechanism to brake-released position upon the de-energization of said winding.

23. An electric vehicle brake of the momentum type comprising, in combination, a drum which rotates during motion of the vehicle wheel to be braked, expansible brake means within said drum, spring means acting to contract said brake means, two magnetic elements adapted to be drawn into frictional gripping engagement upon the energization of an electromagnetic winding carried by one of said elements, a second spring means tending to resiliently urge said elements into close proximity to each other, one of said elements being arranged to rotate simultaneously with said drum, said other element being mounted for oscillation when magnetically attracted to said rotating element, means connected to said oscillatory element and adapted to apply the force derived through the medium of said elements to said brake means with increased leverage so as to expand the same, and supplemental spring means operable to maintain said oscillatory element and said force augmenting means in brake-released position when said winding is deenergized.

24. An electric vehicle brake of the momentum type comprising, in combination, a brake drum which rotates with the vehicle wheel to be braked, friction braking means movable into gripping engagement with said drum, means operable upon a small fraction of one revolution of the vehicle wheel in either direction for moving said braking means into braking engagement with said drum, the last mentioned means including an electro-magnetically operated friction device deriving an actuating force from the motion of the vehicle and arranged to transmit said force to said brake-applying means, the coacting magnetic elements of said device being unrestrained from movement toward each other, and means acting to prevent rotation of the driven element of said device by reason of its frictional engagement with the driving element except when the said device is magnetized.

25. An electric vehicle brake of the momentum type comprising, in combination, a member which rotates during motion of the vehicle, a relatively non-rotatable device arranged for braking engagement with said member, an annular element composed of magnetic material and normally rotating simultaneously with said member, a second annular element mounted for oscillatory movement and arranged for frictional gripping engagement with said first mentioned element by a force acting in an axial direction, a winding comprising a coiled electrical conductor extending continuously in a series of turns to form an annulus and disposed in a single annular recess in one of said elements, so that when energized said winding will constitute the inner and outer portions of that element as magnetic poles of opposite polarity, control means by which the flow of current in said winding may be varied in successive increments to regulate the degree of attractive force between said elements, means connecting said second element and said brake device and adapted to apply the force derived through the frictional engagement of said elements to said device with increased leverage, and means for restoring said last mentioned element and said connecting means to brake-released position when the flow of current in said winding is interrupted.

26. An electric vehicle brake of the momentum type comprising, in combination, a drum mounted on the vehicle wheel to be braked, friction means within said drum, expanding means therefor, a member cooperating with said drum to provide a closed casing, mechanism including a pair of electromagnetically operable friction elements adapted to derive an actuating force from the motion of said drum for application to said expanding means, an insulated electrical conductor having a non-rotatable mounting on said member and having a connection within said casing to the magnetizing winding for said elements which allows for oscillation of the elements.

27. An electric vehicle brake of the momentum type comprising, in combination, a drum carried by the vehicle wheel to be braked; braking means adapted for engagement therewith; a driving friction element carried by said drum; a driven element adapted for frictional gripping engagement with said driving element; mechanism operable to transmit the angular motion of said driven element to said braking means; a non-rotatable member closing the open end of said drum and supporting said braking means, said driven element and said mechanism; an electromagnetic winding carried by one of said elements and adapted when energized to cause frictional engagement of said elements; and means providing an energizing circuit for said winding including a contact terminal non-rotatably mounted on said member and having an electrical connection with said winding which allows for movement of said winding in the operation of said elements.

28. A momentum brake for a vehicle wheel supporting an axle comprising, in combination, a drum mounted on said wheel, braking means adapted for movement into engagement with said drum, a driving friction element carried by said drum externally thereof and providing an inwardly facing surface of relatively narrow radial width and of a diameter corresponding approximately to that of said drum, a substantially rigid metallic ring constituting a driven element and having a surface corresponding in radial width to and adapted for engagement with said first mentioned surface, a relatively stationary support having bearing surfaces disposed a substantial distance from said axle for supporting said ring concentric with said drum for oscillatory movement when engaged by said driving element, means by which the degree of frictional pressure between said elements may be varied, and mechanism actuated by oscillation of said ring to apply said braking means to said drum.

29. An electromagnetic momentum brake for a vehicle wheel which supports an axle having a pivoted yoke-type steering knuckle with a wheel spindle thereon, said brake being composed of a single individual unit comprising, in combination, a drum fixed to and rotatable with said wheel; braking means arranged to frictionally engage said drum; an electromagnetically controlled friction device arranged to derive power from the motion of said wheel; a force-augmenting connection between said device and said braking means; said braking means, friction device, and connection being correlated in a compact unit in an annular space outside of a central space defined by the dimensions of said steering knuckle; and an electrical conductor leading from a source of power on the vehicle and connected to said friction device for energizing the latter to create a force solely within said brake unit itself for operating said braking means.

30. An electric momentum brake for a vehicle wheel mounted on a yoke-type steering knuckle which is pivoted to swing on an upright axis adjacent the plane of said wheel, said brake comprising, in combination, a drum carried by said wheel on the inner side thereof; braking means arranged for engagement with said drum; a friction device operable to derive an actuating force from the motion of said wheel including a driving element rotatable with said drum and a driven element engageable frictionally with the driving element; electromagnetic means associated with said elements and adapted when energized to produce a force for causing engagement of said elements; and a force-augmenting mechanism connecting said driven element and said braking means and operable to actuate the latter in the angular movement of said driven element, the constituent parts of said device and said mechanism being located in and confined in their extent of movement in setting the brake to a space immediately adjacent to the periphery of said drum while leaving a free axial space of such dimensions as to accommodate said steering knuckle when the latter is positioned in conventional relation to the plane of said wheel.

31. In an electric friction brake for a vehicle, the combination of friction braking members and mechanism adapted to derive a force from the momentum of the vehicle for actuating said braking means comprising a magnetic element mounted on the vehicle to rotate during motion of the latter and having an annular friction face disposed substantially vertically, a second magnetic element mounted for angular movement about an axis of said rotatable element and having a frictional face engageable with said rotatable face, one of said elements being mounted for floating movement along said axis to permit of yielding engagement between the elements and thereby compensate for the inherent lateral wobbling of the rotatable element, an electromagnetic winding on one of said elements adapted when energized to produce a force of magnetic attraction between the elements whereby said rotatable element will exert a frictional force on said second element tending to move the latter away from normal brake-released position, means operable to transmit the actuating force thus derived to said braking means, and a spring acting constantly in a direction generally longitudinally of said rotational axis to urge said floating element toward the other element and thereby maintain intimate contact between said faces while said winding is deenergized.

32. An electric friction brake having, in combination, a magnetic element having an annular friction surface which rotates during motion of the part whose motion is to be controlled, a second magnetic element having a friction surface adapted for gripping engagement with said first mentioned surface, one of said elements having concentric poles facing the other element, a winding mounted between said poles and adapted when energized to create a magnetic flux in the magnetic circuit through said poles and the opposing element thereby causing gripping engagement of said friction surfaces, and means acting constantly while said winding is deenergized to maintain the reluctance of said magnetic circuit substantially uniform thereby preventing variation of the reluctance by the inherent lateral wobbling of the rotatable element.

33. In an electric friction brake for a vehicle, a pair of rings of magnetic material having opposed annular faces, one of said rings being rotatable during motion of the vehicle, a winding carried by one of said rings and adapted when energized to create a magnetic flux which threads the ferromagnetic circuit through the faces of said rings thereby causing frictional gripping engagement the magnitude of which determines the degree of braking action, control means governing the closure of an energizing circuit through said winding, and means supplemental to said winding acting automatically to insure the existence of mechanical contact between the engaging portions of said faces coincident with the application of current to said winding by said control means whereby the operation of the brake in response to said control means is unaffected by the lateral wobbling of said rotatable ring.

34. In an electric friction brake, the combination of cooperating braking members and mechanism adapted to derive a force from the momentum of the part to be braked for actuating one of said members comprising a rotatable magnetic element having an annular friction face, a second magnetic element mounted for some degree of angular movement and having a frictional face engageable with the face of said rotatable element, one of said elements being mounted for floating movement to compensate for the lateral wobbling of the rotatable element, an electromagnetic winding on one of said elements adapted when energized to produce a force of magnetic attraction between the elements whereby said rotatable element will exert a frictional force on the second element tending to move the latter angularly away from normal brake-released position, means operable to transmit the angular movement of the second element to one of said braking members, means constantly acting to urge said floating element toward the other element and thereby yieldably maintain continuous contact between said faces while said electromagnet is deenergized, and spring means overcoming the tendency of said second element to move away from brake-released position as an incident to said continuous contact.

35. In an electrically controlled momentum actuator for a friction brake, the combination of two annular magnetic elements having friction faces arranged for axial gripping engagement, one of said elements being mounted to rotate during motion of the part to be braked, the other being mounted for limited angular movement but normally held under spring effect against such movement and thereby maintained in a normal brake-released position, a magnetic winding carried by one of said elements and adapted when energized to produce magnetic attraction of the elements whereby said second element overcomes said spring effect and moves through a limited angular distance to actuate the brake, and means for maintaining a substantially uniform reluctance of the magnetic circuit through said elements comprising spring means normally acting when said winding is deenergized to urge the elements together and maintain light mechanical contact between their friction faces which is insufficient to overcome said spring effect tending to hold said second element in brake-released position.

In testimony whereof we have hereunto affixed our signatures.

ARTHUR P. WARNER.
ADDI BENJAMIN CADMAN.